United States Patent [19]

Johnson et al.

[11] Patent Number: 4,755,928
[45] Date of Patent: Jul. 5, 1988

[54] OUTBOARD BACK-UP AND RECOVERY SYSTEM WITH TRANSFER OF RANDOMLY ACCESSIBLE DATA SETS BETWEEN CACHE AND HOST AND CACHE AND TAPE SIMULTANEOUSLY

[75] Inventors: Billy D. Johnson, Longmont; P. David Dodd, Boulder; Dean P. Kinard, Longmont, all of Colo.

[73] Assignee: Storage Technology Corporation, Louisville, Colo.

[21] Appl. No.: 586,020

[22] Filed: Mar. 5, 1984
(Under 37 CFR 1.47)

[51] Int. Cl.⁴ .................. G06F 13/12; G06F 12/08; G06F 3/00
[52] U.S. Cl. .................................. 364/200; 364/900
[58] Field of Search ... 364/200 MS File, 900 MS File, 364/300

[56] References Cited

U.S. PATENT DOCUMENTS

| | | | |
|---|---|---|---|
| 4,077,059 | 2/1978 | Cordi et al. | 364/200 |
| 4,084,231 | 4/1978 | Capozzi et al. | 364/200 |
| 4,169,284 | 9/1979 | Hogan et al. | 364/200 |
| 4,394,733 | 7/1983 | Swenson | 364/200 |
| 4,413,328 | 11/1983 | Videki, II | 364/900 |
| 4,439,829 | 3/1984 | Tsiang | 364/200 |
| 4,467,421 | 8/1984 | White | 364/200 |
| 4,470,115 | 9/1984 | Wehr | 364/300 |
| 4,489,381 | 12/1984 | Lavallee et al. | 364/200 |
| 4,493,033 | 1/1985 | Ziegler et al. | 364/200 |
| 4,525,777 | 6/1985 | Webster et al. | 364/200 |
| 4,543,626 | 9/1985 | Bean et al. | 364/200 |
| 4,607,348 | 8/1986 | Sheth | 364/900 |

OTHER PUBLICATIONS

W. C. Hoskinson et al., *Multiprocessor Control of Cached Peripheral Systems*, IBM Tech. Disclos. Bull., (vol. 26, No. 7A, Dec. 1973), p. 3399.

*Primary Examiner*—Raulfe B. Zache
*Assistant Examiner*—Robert B. Harrell
*Attorney, Agent, or Firm*—Woodcock Washburn Kurtz Mackiewicz & Norris

[57] ABSTRACT

A host connected outboard back-up and recovery system has a tape drive connected to a plural port solid-state cache memory which, in turn, is connected to a disk drive. Data to be backed-up can first be copied from the disk drive to the cache and then from the cache to the tape drive in back-up operations, so that the relative speeds of the disk drive and the tape need not be matched. An outboard controller controls flow of the data between the disk drive and the tape drive and additionally controls storage of the data on the tape, so that host computer involvement is avoided.

6 Claims, 6 Drawing Sheets

OUTBOARD BACK-UP AND RECOVERY SYSTEM WITH TRANSFER OF RANDOMLY ACCESSIBLE DATA SETS BETWEEN CACHE AND HOST AND CACHE AND TAPE SIMULTANEOUSLY

FIELD OF THE INVENTION

This invention relates to improvements in data storage for large data processing systems. More particularly, the invention relates to a data storage system for connection to a conventional channel of a data processing system, in which back-up, that is, periodic copying of data from more expensive magnetic disk memory to less expensive magnetic tape memory, can be performed substantially automatically, without impacting host computer operations, and in a highly efficient manner.

BACKGROUND OF THE INVENTION

Data processing systems have conventionally comprised two major elements, a host computer comprising an arithmetic and logic unit, including a main memory unit in which is stored the software or programs being run, and a data storage system, in which the data, and, in some cases, the programs as well, are stored when not actually being used. Historically, the market has developed in such a way that the evolving of new systems has proceeded piecemeal; that is, improvements in host computers are only commercially viable when they do not require the discarding of old data storage systems. Similarly, improved data storage systems are primarily useful when they can improve the performance of a given host computer without requiring its replacement. The present invention is of the latter type, in that it provides improvements in efficiency of operation of a large data processing system without requiring substantial modification or replacement of a host computer.

It will be recognized by those skilled in the art that a common problem in the data processing industry is the storage over long periods of time of the vast amounts of data which are accumulated in data processing operations, in a way which is as inexpensive as possible, while being reliable. A number of commonly assigned applications have been filed for devices directed to this end. For example, copending Ser. Nos. 389,295, now abandoned and 384,381, now U.S. Pat. No. 4,467,421 as well as other applications, relate to a so-called Virtual Storage System (VSS). The device described in these applications comprises what in other circumstances might be considered an independent processor, operating outboard a conventional "channel", as that term is used in connection with the computer systems sold by IBM Corporation. The VSS processor is used to divide data sets which are supplied by the host computer into subportions sized to fit conveniently onto disk and tape storage media, and to maintain a directory of the locations of these subportions, such that upon their subsequent recall, the data set can be reassembled and presented to the host computer, all without the host computer's requiring detailed information as to the actual storage locations or involving the user in any significant way. The virtual storage system as described in those applications also includes the possibility that the intelligence of the outboard storage subsystem processor can be used to copy data sets from the relatively expensive disk memory to relatively less expensive tape memory for long-term archival storage, so that if, for example, a data set stored on disk is destroyed by some mischance, an accurate copy of the data set has been made on tape and can be readily supplied for replacement of the data set lost. This approach is workable and does perform the data back-up and recovery operations automatically; that is, without CPU intervention.

However, the data storage system described in those application has a few drawbacks. It requires substantial additional computing power and hence expense. Furthermore, the embodiment now available is limited to only physically sequential data sets. Perhaps more significantly, the data set is not available while it is being copied from disk to tape. Finally, its software operates independently of any data management software which may be desired on the host computer. This can cause potential access conflicts.

Other prior art approaches are even less useful than that just described. For example, basic back-up operations as previously performed simply involve using the CPU itself as the conduit by which data flows from disk to tape for back-up. This is highly undesirable because it consumes valuable CPU time to perform an essentially simple copying function. Clearly, this cuts into the availability of the host computer, the most valuable resource of any data processing system. Furthermore the data set being backed-up is not available, thus delaying work on programs using that data set. Moreover, typically these back-up operations are performed as a batch job, once per day. If a data set is modified more than once a day, at least at some point the back-up copy is out of date.

Nor has this problem been addressed by commercially available host computer software. IBM's data base management program, referred to as "HSM" for Heirarchical Storage Manager, does perform some back-up operations automatically, but again uses the CPU to run this program, rendering it unavailable, and does not provide a way in which the data set being backed-up can be available simultaneously for other purposes.

Ideally then, there are four particularly important requirements of a good back-up and recovery system. The back-up operations performed should be timely, in order to preserve integrity of the data as often as it is changed, and so that the backed-up data set is always up to date. Second, the data should be available to other programs while the back-up operation is taking place, in order to minimize processing delays. Third, the impact of performing back-up operations on the CPU as well on job through-put should be minimized in order that the back-up does not interfere unduly with other processing operations. Finally, the recovery operation, the copying of the data from tape back to disk when the data set on disk has failed for some reason, should be manageable and performed easily by an operator, rather than require a long sequence of complex operations which would tend to lead to error.

OBJECTS OF THE INVENTION

Accordingly, it is an object of the invention to provide an outboard back-up and recovery system in which data back-up from disk to tape is performed automatically in a timely fashion and without requiring the use of the host computer to control the operation, or as a part of any required data path.

It is a further object of the invention to provide an outboard back-up and recovery system according to which a data set being backed-up is simultaneously available for use in other processing.

It is a further object of the invention to provide an outboard back-up and recovery system in which the data pathways by which the data is transmitted from disk to tape are not the same as those connecting the data subsystem to the host computer such that resources and job through-put are not adversely affected by use of the recovery system.

Finally, it is an object of one embodiment of the invention to provide an outboard data back-up and recovery system in which sufficient intelligence is provided that the recovery operations are automatic from the host computer's and the user's points of view.

SUMMARY OF THE INVENTION

The above needs of the art and objects of the invention are satisfied by the present invention which comprises a data storage subsystem having a solid-state memory and controller therefor connected to the storage directors conventionally comprised in a disk storage subsystem; the solid-state cache memory has additional pathways and ports so that it can receive data from disk drives via the directors and direct it thence, via a tape control unit, directly to a tape drive. Accordingly, data desired to be backed-up can be copied from disk into cache, or for that matter, from the host computer into cache, and thence be copied directly to tape. In this way, the data pathways connecting the disks with the host computer are not interfered with by back-up operations. Nor need disk operations be synchronized with tape operations, as the cache memory provides a buffer for the data between disk and tape. According to a first embodiment of the invention, the back-up tapes are made according to the same format as in the prior art, and can be employed in recovery operations as required by the host computer operating system as is conventional. Alternatively the cache memory can be used as a buffer between disk and tape in recovery operations, or the data could be read directly from the tape unit into the host computer by way of an ordinary channel, as desired.

In the preferred embodiment, the back-up and recovery system of the invention is added on to a cache memory subsystem which is the subject matter of co-pending application Ser. No. 325,346 filed Nov. 27, 1981, now U.S. Pat. No. 4,476,526. That application discusses the structure of the cache memory and the cache manager, which according to the present invention assume the additional functions of interfacing to and control of a tape memory unit for back-up purposes.

BRIEF DESCRIPTION OF THE DRAWINGS

The invention will be better understood if reference is made to the accompanying drawings in which:

FIG. 2 shows in FIG. 2a a flowchart of the operations undergone in back-up and recovery, and FIG. 2b details the portions of the system which carry out the operations shown in FIG. 2a;

DESCRIPTION OF THE PREFERRED EMBODIMENTS

Figure 1:
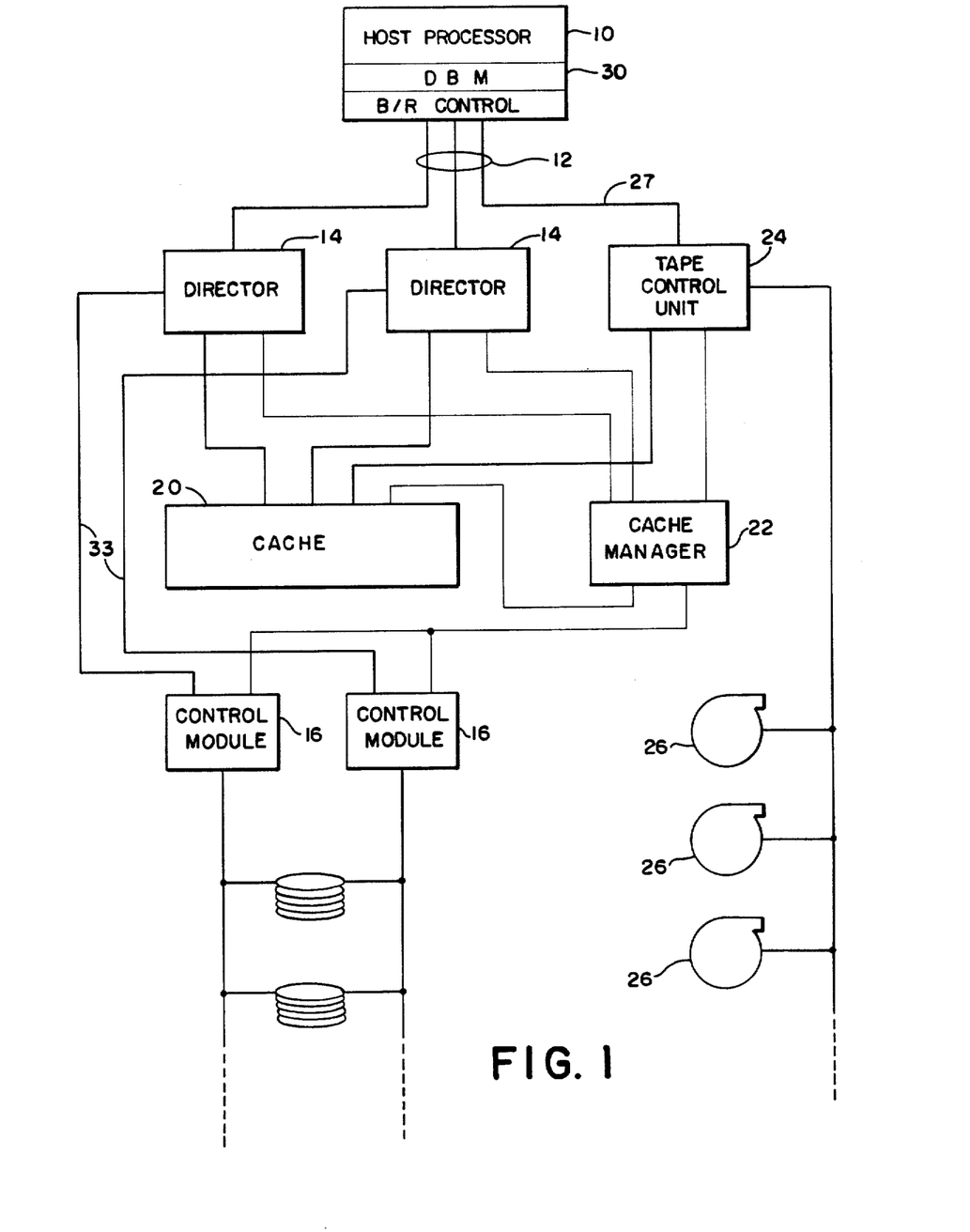
FIG. 1 shows schematically the components of the outboard back-up and recovery system according to the invention.

As mentioned above, in the presently preferred embodiment of this invention, it is configured as an addition to and improvement on the system described in co-pending application Ser. No. 325,346 filed Nov. 27, 1981 now U.S. Pat. No. 4,476,526. The elements of the system shown and claimed in that application are shown in FIG. 1, in which the additional elements added hereby are also shown. According to U.S. Pat. No. 4,476,526, a host computer 10 is conventionally connected via a channel 12 to one or more storage directors 14. These are then connected by way of control modules 16 to disk drives 18 for the storage of data. Thus, if the host computer desires to store data, it directs the data and suitable commands over the channel 12 through the directors 14 which access the proper control module 16. As shown either of the directors 14 can access any of the control modules 16, (two being shown) thus accessing a large number of drives 18. Data is then passed by way of the appropriate control module into the drive. As shown, the drives 18 may additionally be conducted to plural control modules for further path selection flexibility. According to the invention of U.S. Pat. No. 4,476,526, a cache memory 20, which may typically be a solid-state memory comprised of a large amount of random access memory (RAM) is additionally connected to the directors 14. This cache memory is controlled by a cache manager 22. According to the invention of copending Ser. No. 325,350 filed Nov. 27, 1981 now U.S. Pat. No. 4,468,730, the cache manager is enabled to detect when a particular request from the host computer is liable to be one of a sequence of such requests, and therefore directs that additional data be taken from the disk 18 from the vicinity of the data previously accessed by the host computer, and causes this to be stored in the solid-state cache, in anticipation of a subsequent host computer request for that data. If such a subsequent request is then received, the data, being already in the solid-state cache, can be supplied to the host computer by way of the director 14 much more quickly than if it were only stored on the drive 18.

According to the present invention, a tape control unit 24 and a number of suitable tape drives 26 are added to the system shown in U.S. Pat. No. 4,476,526. The tape unit is connected to the channel in the ordinary way by a bus 27 and is additionally connected to the cache 20 for data flow and to the cache manager 22 for control flow.

With respect to the system described in U.S. Pat. No. 4,476,526, additional software described below is added to the cache manager software, to support the functions called for, similarly, back-up and recovery software indicated generally at 28 is added to the data base management software 30 previously comprised in the host computer. The functions performed by the cache management software and that added to the host software will be discussed in detail below.

As shown the tape control unit 24 and the tape drives 26 are functionally connected to the cache manager 22, and to the cache memory 20. Thus, if a data set is in the cache 20 and the manager 22 is directed to back it up by the host computer, it is a simple matter to copy it from the cache into a tape carried on a tape drive 26. Thereafter, if revovery is required due to a disk read error or the like, the data can be supplied, under control of the host computer's operating system, directly to the host computer over the bus connection 27. Alternatively, recovery could be controlled by the cache manager, in which case the data on tape might be copied back into the cache 20 for copying to a disk drive 18, or from the cache 20 directly to the host computer 10 via a director 14.

It will be appreciated that a first data pathway has been provided from the disk drive 18 to the cache 20, and a second from the cache 20 to tape control unit 24, and thence to the tape drives 26 thereby permitting back-up without impacting host computer operations in any way. For similar reasons the tape control unit has access to the cache 20 through additional ports, separate from those accessed by the directors 14. Accordingly, data can flow in a back-up operation from one part of the solid-state cache 20 to the tapes 26 without impacting ordinary data flow, either from the disks 18 via a director 14 into the cache 20 or from the cache 20 through the director 14 to the host computer 10, thus satisfying the object of the invention of permitting back-up without impacting other operations. Similarly, the cache manager 22 can readily be adapted to decide where and on what sorts of back-up media a particular data set is to be stored, and similarly can record of the locations on tape where the records are stored. Again, this is accomplished without impacting host computer operations or requiring operator input. In a particularly preferred embodiment, from time to time an "accumulate" tape might be made, effectively making a copy of the entire contents of a given disk.

It will be observed that the disk drives 18 are connected to plural directors 14 and to the cache 20 and cache managers 22 by way of plural control modules 16. This can readily be accomplished by use of presently available hardware sold by the assignee of the present invention referred to as "Dual Port Control Modules with String Switches."

In general data sets stored by the host computer on disk are copied to the tape only when they have been changed; that is, the back-up and recovery control software 28 added to the host computer can be used to indicate to the cache manager 22 that a particular data set should be backed-up. This will now be discussed in connection with FIG. 2. Those skilled in this art will appreciate that the storage of a data set in the cache 20 effectively buffers it, providing a simple method of matching the varying speeds at which data is read from and written to disk and tape, respectively, and permits variations of these rates without necessitating changes in the data system hardware.

Figure 2:
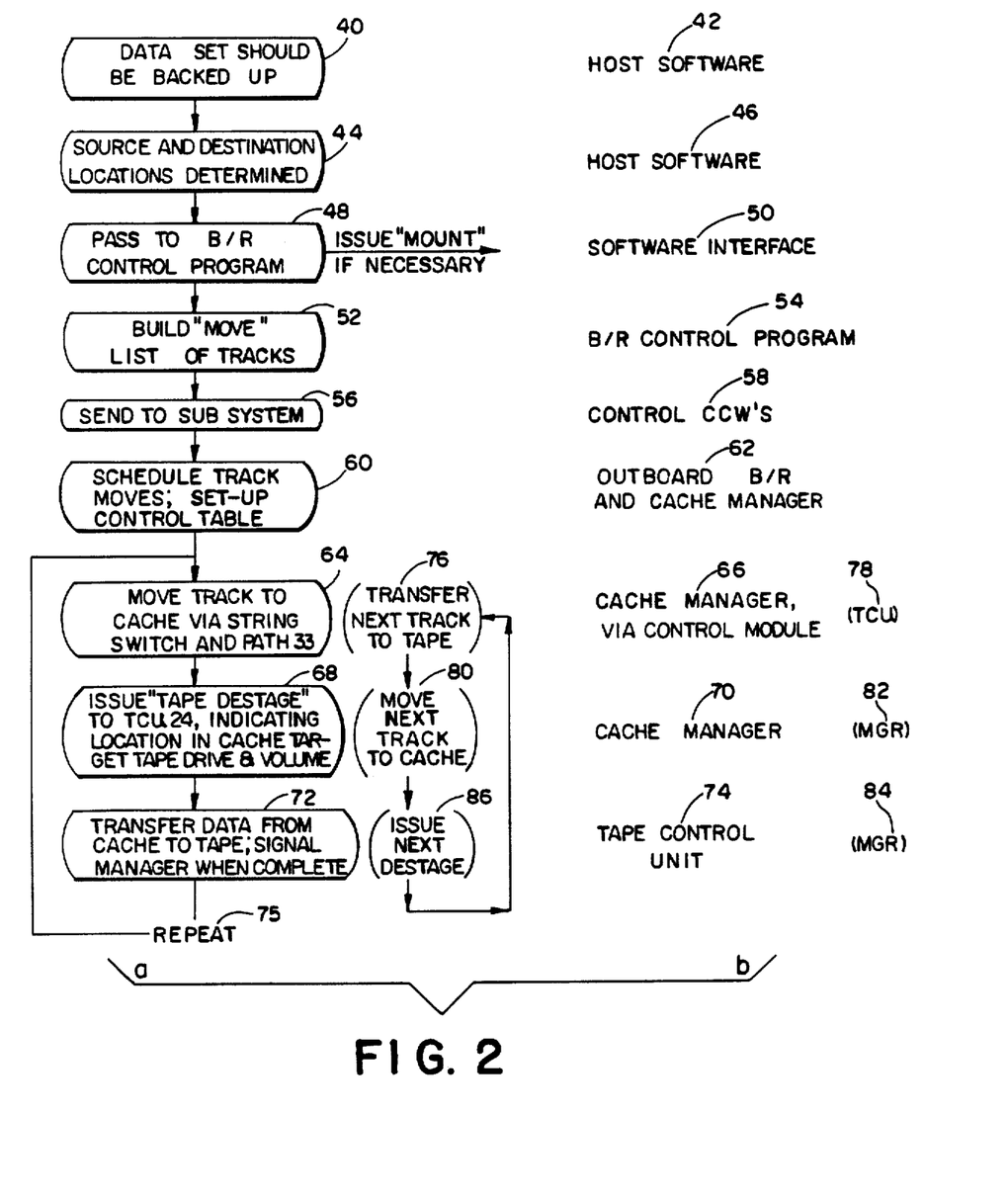

FIG. 2 comprises a left hand portion (FIG. 2a) and a right hand portion (FIG. 2b). FIG. 2a shows schematically the steps in the back-up of data; that is, the copying of data from a disk drive to a tape unit. The right hand side, FIG. 2b indicates where in the system of FIG. 1 the specific operation indicated in FIG. 2a is performed. Thus, for example, host data base management software 30 determines at 40 that a particular data set should be backed-up; that is to say, that it has been updated, and should be copied to tape, so that in the event of a failure of a disk drive or the like, the updated data is available. Accordingly, this function is indicated at 42 as being performed in host software. Similarly, the source of the data, its location in the host computer's main memory, and its destination on tape is determined at 44, again by host software at 46. The source and destination locations determined at 44 are then passed at 48 to the back-up and recovery control program 28. If necessary, a "MOUNT" instruction, indicating to an operator that a particular reel of tape needs to be mounted on a drive, can be generated. As shown at 50, passage of the instructions from the host's software to a back-up and recovery control software 28 is done by way of a straight forward software interface.

As shown at 54, the back-up and recovery control program then builds a move list at 52; that is, a list of tracks which are to be copied to tape for achival purposes. As in U.S. Pat. No. 4,476,526, it is convenient to back-up data stored on disk track-by-track, that is, in increments of one disk track. Hence, this terminology is used here. However, the increments of data stored could be chosen to be any convenient amount. At 56, the move list is then sent to the storage subsystem, i.e., to the cache manager 22, by way of passage of a number of control channel command words (CCW's) as that term is conventionally understood, at 58. The cache manager 22, being the receiver of the move list thus generated, then schedules the track moves at 60 and sets up a control table which reflects the status of the back-up operation and resolves any concurrent data set access problems which may occur. As noted at 62, this is done by the outboard control program run by the cache manager.

The subsequent steps shown in FIG. 2a are repeated for subsequent portions of a data set or for subsequent data sets. The parenthesized material indicate how the operations required can be performed in parallel, because they are performed by different portions of the subsystem. Thus, for example, at 64, a first track is moved or "staged" to cache 20 from a disk drive 18 via the string switch data path 33 and port 34. This is done, as noted at 66, by the cache manager 22 acting via the control module 16. Next, a "TAPE DESTAGE" command is issued at 68 by the manager, as noted at 70, indicating the location in the cache from which the data is to be read and the target tape drive and volume; that is to say, where and on what tape it is to be written. Thereafter, at 72, the tape control unit 24 "destages" the data, that is, transfers the data from the cache to the target tape volume, as indicated at 74. It signals the cache manager 22 when this operation has been completed. The process is then repeated as indicated at 75. As indicated by the parenthesized material, some of the operations can be completed in parallel. Thus, while a first track is being moved to cache as at 64, the next track can be transferred to tape as at 76. As indicated at 66, the first move to cache is being performed by the cache manager. Simultaneously the tape control unit 24 transfers the second track to tape at 78. Next, while the "TAPE DESTAGE" command relating to the first track is being issued to the tape control unit at 68, the second track can be moved to cache at 80 by the cache manager as shown at 82. Finally, while data is being transferred from cache to tape at 72, the subsequent DESTAGE command can be issued at 86, also by the cache manager, at 84. Thus, the operations can proceed at a high speed and with excellent utilization of the control system hardware. The process is continued until the move list is exhausted.

It will be appreciated by those skilled in the art that performing back-up operations may require, for example 20 minutes out of a 24-hour day, even if only those tracks on disk which have been altered during that day are to be copied. A possible problem arises if the host computer seeks to access a data set which is being backed-up during the back-up job; if all access to a disk track is forbidden during the entire period of the back-up job, this would substantially impede host computer functions. However, uncontrolled access would be likely to lead to data integrity problems. Accordingly, access must be permitted, but the data integrity problem must be solved.

Two basic ways of solving this problem are presented, depending on whether it is decided to make a complete copy of all altered data sets, as they existed at the beginning of processing of the back-up job, or whether it is determined to copy them as they existed at its end. In the former case, where the eventually backed-up version to tape is to include every disk track which had been altered up to the beginning of the back-up job, access to a track can be permitted if that track has already been backed-up in this particular back-up operation. However, if a track is scheduled for back-up, that is, because it has been changed since the last back-up operation, but has not yet been backed-up, the cache manager prevents access until the back-up of that track has been completed. This is done so that a copy of the data set as it existed at the beginning of the back-up job can be made. In such case, the storage subsystem will provide a "DEVICE BUSY" or "RETRY" signal to the host computer; these are signals given when a host computer seeks access to a data set stored on a disk drive which is already supplying data to another host computer or another program on the same host computer. The duration of the BUSY condition is expected to be very short, so that its provision during back-up operations will not impact the overall performance of the host computer. If a track is accessed during the back-up job after having itself been backed-up, it is simply added to the list of tracks to be backed-up, and is copied in the following back-up processing operation or is added to the list of tracks to be backed-up in this particular period, if the operation is still going on. Thus, the same track might be backed-up twice in the same back-up operation. This is desirable, because the data, having been altered, is different.

In the second scenario, where the copies to tape are to be of the data sets as they existed at the end of the back-up job, each time a track is changed, it is added to the list for back-up. Thus, if a track is accessed during the back-up job, it is simply added to the list in the ordinary way and is copied at the end of the back-up job. This second alternative will in most cases be preferable, because it does not involve any interference with the host computer operations, such as would occur, for example, if the host computer attempted to access to a track which was on the list to be backed-up but had not yet been reached for back-up. However, this approach does not provide for making a copy of the "interim" versions of the data set; this could be done by storing any data set accessed during back-up in the cache, and copying the data set to tape if it were then altered by host computer processing.

Possible sequences of steps involved where the host computer seeks access to a data set listed for back-up during back-up processing are shown schematically in FIGS. 3-6. These diagrams use conventional IBM Corporation commands and concepts and will be understood by those skilled in the art without detailed explanation.

Figure 3:
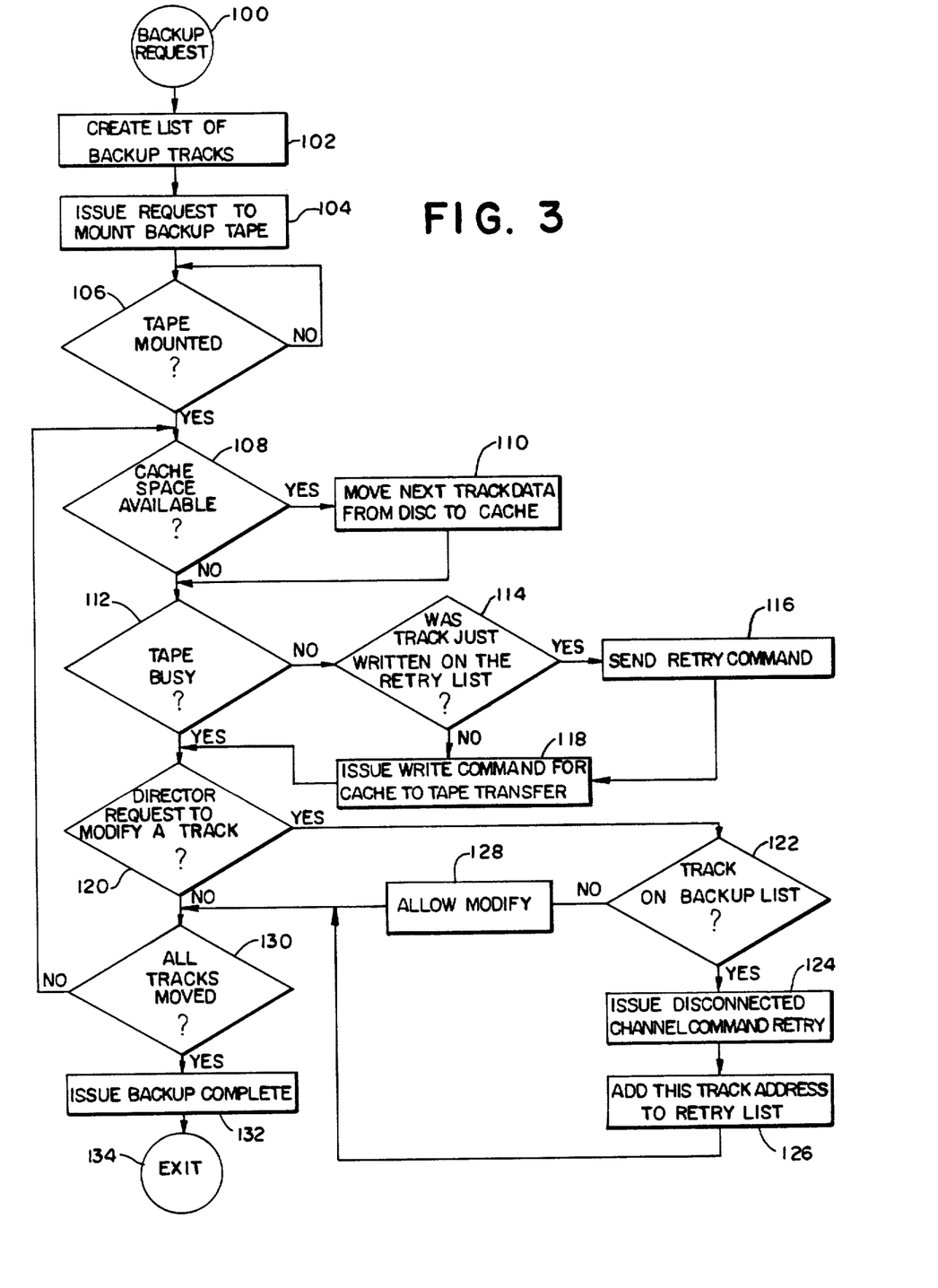
FIG. 3 details one possible procedure followed when the host computer accesses a disk track scheduled to be backed-up during the back-up operation.

FIG. 3 gives a method which preserves the file as it exists at the start of the back-up procedure, by using "COMMAND RETRY" when a write request to one of the affected tracks is received, but which delays clearing the retry until the track is written to tape in the normal sequence of writing the tracks. For example, after a "BACKUP REQUEST" is made at step 100, a list of backup tracks is created at step 102. Then, a request is issued at step 104 to mount the backup tape, whereupon it is determined whether the tape has been mounted at step 106. After it has been determined that the tape has been mounted, a determination is made as to whether cache space is available at step 108. If cache space is available, the next track of data is moved from disk to cache at step 110, whereupon a determination is made as to whether the tape is busy at step 112. On the other hand, if cache space is not available at step 108, determination step 112 is immediately invoked.

If the tape is not busy, a determination is made as to whether the track just written is on the retry list at step 114. A retry command is sent at step 116 if the track just written was on the retry list, otherwise a write command for cache to tape transfer is issued at step 118. Upon issuance of the write command at step 118, or in the case where the tape is not busy as determined by the step 112, a determination is made at step 120 as to whether the director has requested to modify a track. If so, a determination is made as to whether the track to be modified is on a backup list at step 122.

If the track to be modified is on the backup list, a disconnected channel command retry is issued at step 124, whereupon the particular track's address is added to the retry list at step 126. On the other hand, if the track to be modified is not on the backup list, or after the performance of step 126, the track is permitted to be modified at step 128. Thereafter, a determination is made as to whether all the tracks have been moved at step 130. If not, a return is made to step 108 where the determination is made as to whether cache space is available. However, if all the tracks have been moved, "BACKUP COMPLETE" is issued at step 132 and the sequence is exited at step 134.

Figure 4:
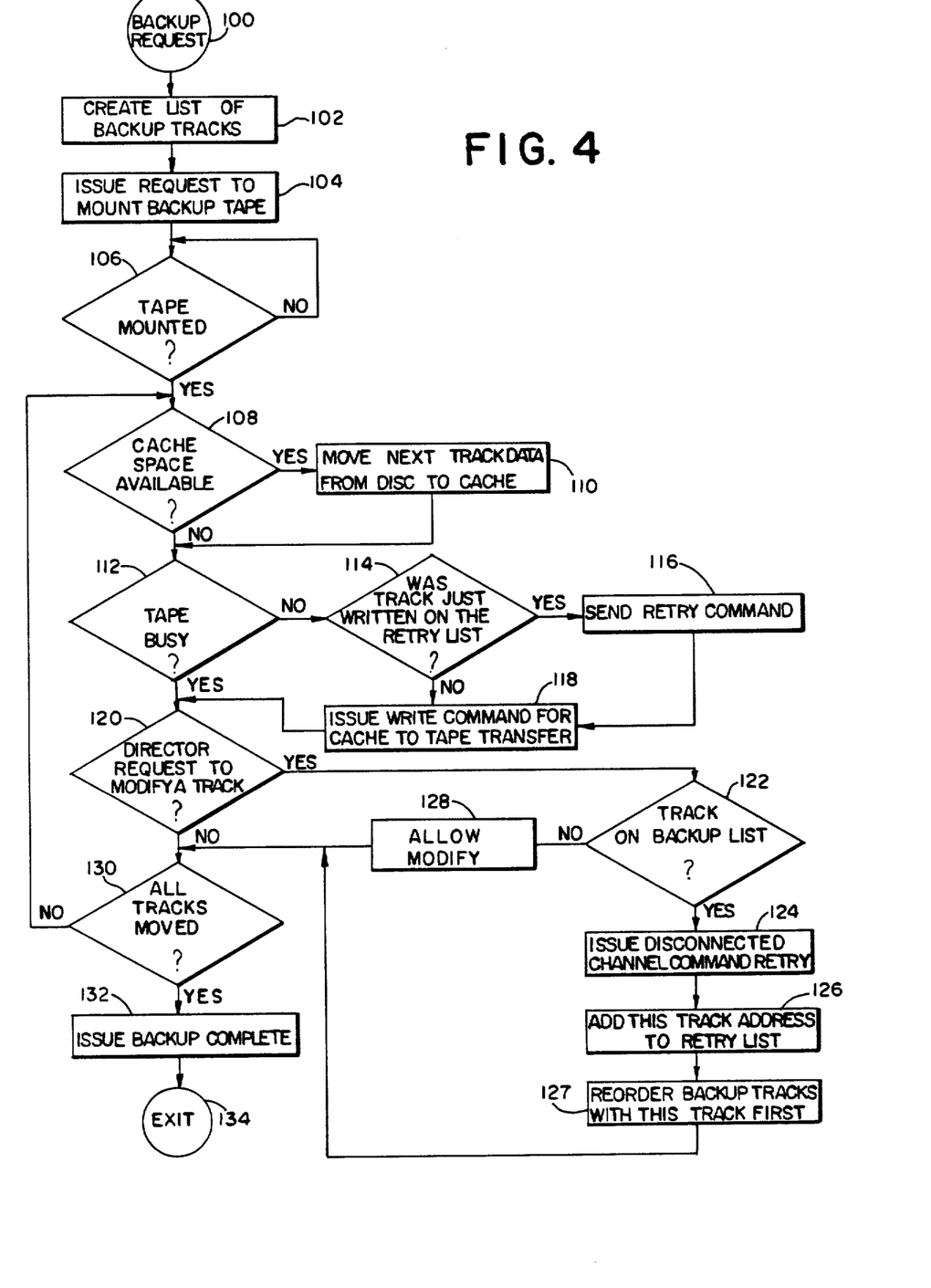
FIG. 4 details another possible procedure followed when the host computer accesses a disk track scheduled to be backed-up during the back-up operation.

FIG. 4 gives a method which preserves the file as it exists at the start of the back-up procedure by using "COMMAND RETRY" when a write request to one of the affected tracks is received, but it places that track as the next one to be written; after it is written, the retry is cleared. That is, the method shown in FIG. 4 is similar in all respects to that shown in FIG. 3 with the exception that after performance of step 126 in which the particular track address was added to the retry list, a step 127 is added in which the backup tracks are reordered with the particular track first.

Figure 5:
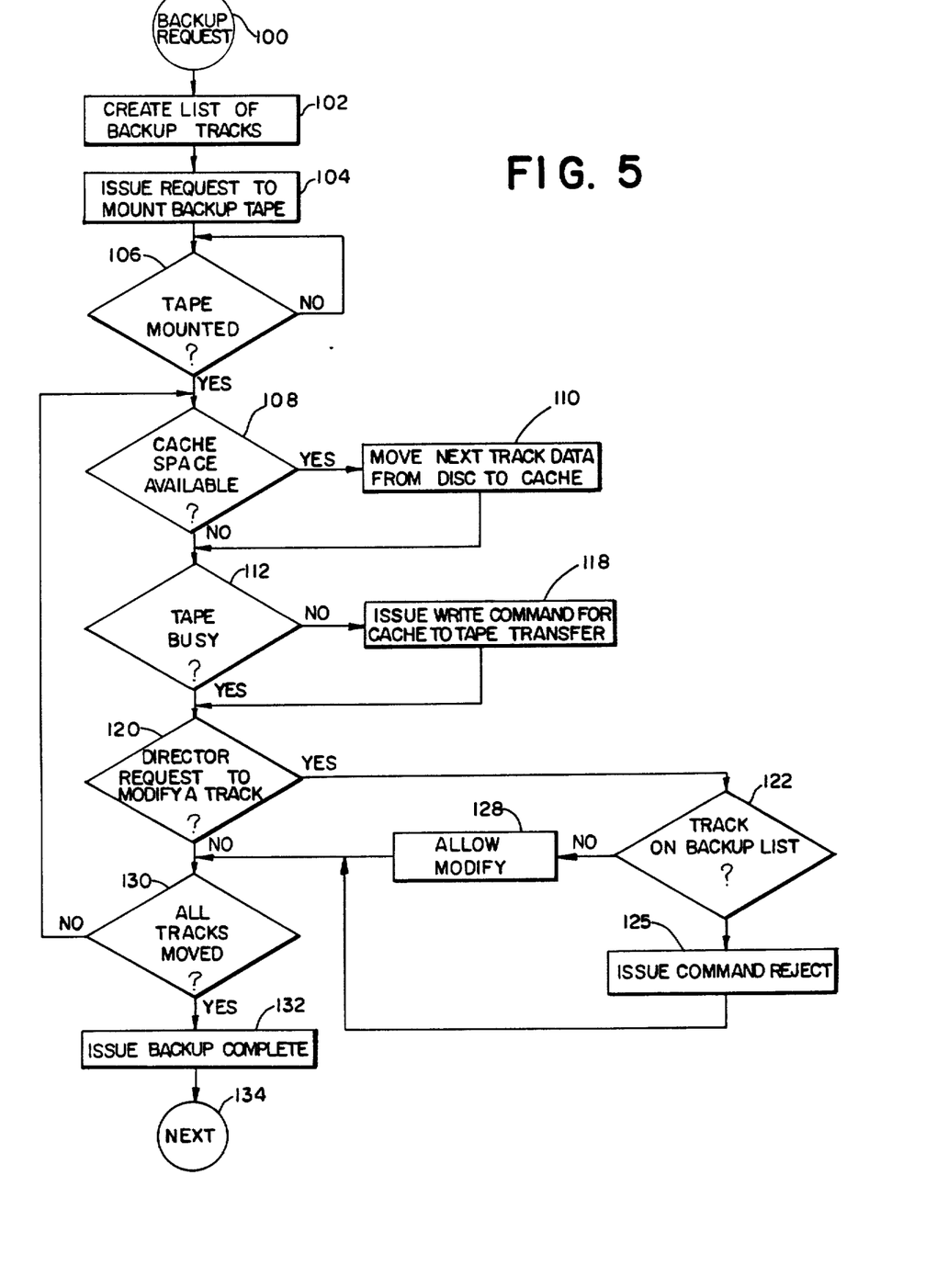
FIG. 5 details a method which preserves the file as it exists at the start of the back-up procedure by rejecting any "WRITE" commands to tracks being backed-up.

FIG. 5 gives a method which preserves the file as it exists at the start of the back-up procedure by rejecting any "WRITE" commands to tracks being backed-up. The sense bits would indicate that the reason for the reject is "back-up in progress". The method of FIG. 5 is similar in all respects to that shown in FIG. 3 with the exception that steps 114 and 116 are not performed. That is, if the tape is not busy as determined at step 112, step 118 issuing the write command is immediately performed. Moreover, steps 124 and 126 are not performed since a command reject is issued at step 125 if the particular track is not on the backup list.

Figure 6:
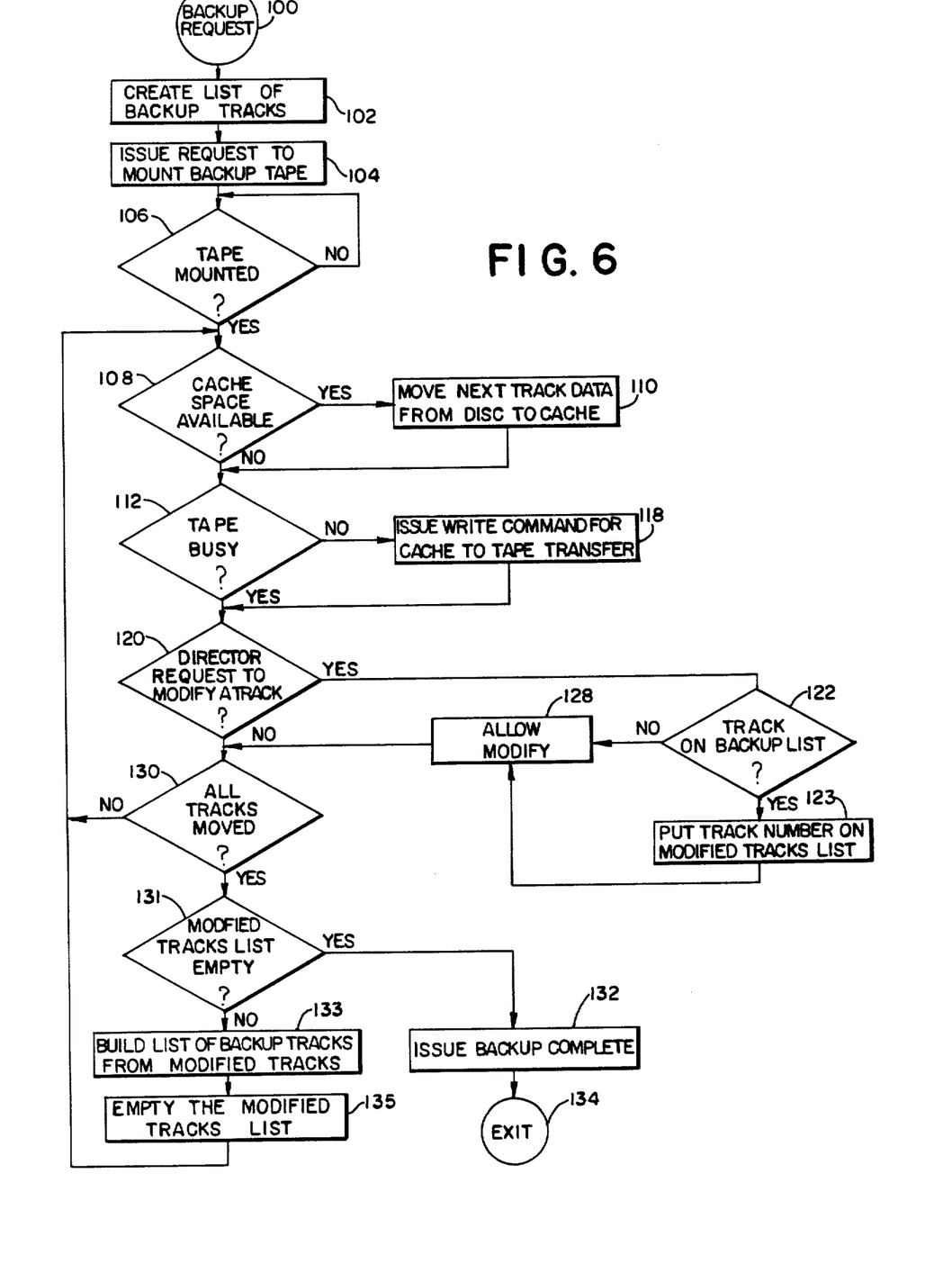
FIG. 6 details a method that preserves the file as it exists at the end of the back-up procedure.

FIG. 6 is a method that preserves the file as it exists at the end of the back-up procedure by rewriting to tape any tracks that are modified while the back-up is in progress. The method according to FIG. 6 is similar in all respects to that as shown in FIG. 5 with the following exceptions. If it is determined whether the particular track is on the backup tracks list at step 122, the particular track number is placed on a modified tracks list at step 123, thereafter being modified at step 128. Furthermore, if all the tracks have been moved, as determined by step 130, a determination is made at step 131 as to whether the modified tracks list is empty. Only if the modified tracks list is empty will "BACKUP COMPLETE" be issued at step 132. Otherwise, a list of backup tracks is built up from the modified tracks at step 133, the modified tracks list is emptied at step 135, and a return is made to step 108 where it is determined whether cache space is available.

It will be noted by those skilled in the art that this flexibility is made possible, at least in part, by the fact that the cache can be accessed simultaneously by the host computer and by the tape unit; that is, for example, if a track is stored in cache for backing-up and the host computer accesses it, it can be immediately copied to the host computer and can also be copied to the tape unit for processing, without interfering with the host computer operations.

Data recovery operations, undergone when it is determined by conventional methods that a data set on disk or in the main memory of the host computer is erroneous, can proceed conventionally, i.e. the host operating system directs that the tape containing the file in error be mounted. Alternatively, the inverse of the back-up procedure can be employed. In this scheme, data is passed from a tape drive 26 through the tape control unit 24 and thence into the cache 20 for forwarding through the director 14 and channel 12 and thence to the host computer 10, for processing as required. Similarly, data could be passed from cache 20 through director 14 for storage on a disk drive 18 if the host computer 10 did not have immediate need for the data.

It will be appreciated by those skilled in the art that while a preferred embodiment of the invention has been described, numerous modifications and improvements can be made thereto without departing from the spirit and scope of the invention which is, therefore, not to be measured by the above exemplary disclosure but only by the following claims.

We claim:

1. A data storage subsystem for connection to a host computer by way of a channel, said subsystem comprising:
    magnetic disk data storage means;
    magnetic tape data storage means including a plurality of tape drives;
    first data path means for transmission of data from said channel to said disk means, second data path means for transmission of data from said disk means to a cache means, and third data path means for transmission of data from said cache means to said tape means;
    director means for directing the flow of data along each of said data path means connecting said cache means, said channel and said tape means;
    a tape control unit connected between said cache means and said tape means by data pathways permitting flow of data from said cache means via said tape control unit to said tape drives, said tape control unit being further connected to a cache manager portion of said director means by means for transmitting control information from said cache manager to said tape control unit; and
    means for accessing from said cache means, by said host computer, data stored in said cache means in randomly accessible sets while the same data is being copied from said cache means to said tape means.

2. The system of claim 1 wherein said director means forms a portion of said first data path means, said cache means connected to said director means by a branching data path permitting flow of data from said disk means via said director means into said cache,
    thereby enabling a data set to be copied from a disk means into said cache means and thence to said tape means.

3. The system of claim 1 wherein said cache manager controls flow of data between said cache means, said disk means and said tape means.

4. The system of claim 3 wherein said cache manager controls said flow of data in response to commands received from software comprised in said host computer for supervision of back-up and recovery operations.

5. A method of storing data records on magnetic tape storage media from magnetic disk storage media, comprising the steps of:
    monitoring data processing operations accessing data stored on said magnetic disk storage media;
    maintaining a list of the portions of said data which are altered in said processing operations; and
    periodically copying predetermined amounts of the data stored on said magnetic disk storage media into a solid state cache memory means in randomly accessible sets, and thence to said magnetic tape storage media, said amounts including those portions indicated on said list as having been changed;
    wherein said monitoring, maintaining and copying steps are performed by and under control of a storage manager, said storage manager comprising processor means located outboard of a channel connecting a memory subsystem comprising said magnetic disk storage media and said magnetic tape storage media to a host computer, whereby said copying operations are performed without intervention of said host computer;
    wherein said subsystem further comprises said solid state cache memory means into which data is copied from said magnetic disk storage media and from whence data is copied to said magnetic tape storage media, such that operations of said magnetic disk storage media and said magnetic tape storage media need not by synchronized in order to effectuate copying of data from said magnetic disk storage media to said magnetic tape storage media;
    wherein said copying operations are performed in a batch-wise fashion at intervals during operation of a computer system, wherein a list of data sets to be copied from said magnetic disk storage media to said magnetic tape storage media is accumulated over time, and said data sets are copied substantially continuously in a single copying operation;
    wherein a number of tracks to be copied are first copied from said magnetic disk storage media into said solid state cache memory means and thence are copied from said solid state cache memory means to said magnetic tape storage media, whereby efficiency of operation of said copying is obtained; and wherein said solid state cache memory means is provided with plural ports through which access thereto may be made, thereby enabling simultaneous access to said solid state cache memory means by said host computer and by tape units containing said magnetic tape storage media for copying of data from said solid state cache memory means to said magnetic tape storage media.

6. The method of claim 5 wherein if said host computer requests access to a data set stored in said cache for copying to said tape which has not yet been copied to tape, access to said data by said host computer is refused until said copying step is completed, whereby an accurate copy of said data on tape is made prior to alteration thereof by said host computer.

* * * * *